US010452632B1

(12) United States Patent
Simmen et al.

(10) Patent No.: US 10,452,632 B1
(45) Date of Patent: Oct. 22, 2019

(54) MULTI-INPUT SQL-MR (71) Applicant: Teradata US, Inc., Dayton, OH (US)

(72) Inventors: David Simmen, Mountain View, CA (US); Ling Wang, Foster City, CA (US); Milind Joshi, San Jose, CA (US)

(73) Assignee: Teradata US, Inc., San Diego, CA (US)

( * ) Notice: Subject to any disclaimer, the term of this patent is extended or adjusted under 35 U.S.C. 154(b) by 67 days.

(21) Appl. No.: 14/317,995

(22) Filed: Jun. 27, 2014

Related U.S. Application Data (60) Provisional application No. 61/841,295, filed on Jun. 29, 2013.

(51) Int. Cl.
| | | |
|---|---|---|
| G06F 17/30 | (2006.01) | |
| G06F 16/22 | (2019.01) | |
| H04L 29/08 | (2006.01) | |
| G06F 16/27 | (2019.01) | |
| G06F 16/28 | (2019.01) | |

(52) U.S. Cl.
CPC .......... *G06F 16/2282* (2019.01); *G06F 16/27* (2019.01); *G06F 16/285* (2019.01); *H04L 67/1097* (2013.01)

(58) Field of Classification Search
CPC ......... G06F 17/30339; G06F 17/30575; G06F 17/30598; H04L 67/1097
USPC ........................................................ 707/610
See application file for complete search history.

(56) References Cited

U.S. PATENT DOCUMENTS

| | | | | |
|---|---|---|---|---|
| 6,092,062 | A * | 7/2000 | Lohman | ............ G06F 17/30463 |
| 6,112,198 | A * | 8/2000 | Lohman | ............ G06F 17/30445 |
| 2004/0122845 | A1 * | 6/2004 | Lohman | ............ G06F 17/30445 |
| 2007/0239673 | A1 * | 10/2007 | Barsness | ........... G06F 17/30463 |
| 2012/0109888 | A1 * | 5/2012 | Zhang | ............... G06F 17/30584 |
| | | | | 707/610 |
| 2014/0101213 | A1 * | 4/2014 | Ueda | ................. G06F 17/30194 |
| | | | | 707/827 |
| 2014/0380051 | A1 * | 12/2014 | Branish, II | .......... G06F 21/6227 |
| | | | | 713/169 |

OTHER PUBLICATIONS

NPL1: Aster-Training-Slides hereinafter as Aster. Title: Technical Overview of Aster. Jun 26, 2012. pp. 1-126, Karthik Guruswamy, Yushu Yao.*

(Continued)

Primary Examiner — Hickham Skhoun
(74) Attorney, Agent, or Firm — Randy L. Campbell, Jr.

(57) ABSTRACT

A system may include an array of storage devices configured to store a data. The system may further include an array of processing nodes in communication with the array of storage devices. The array of processing nodes may receive a request to perform at least one task associated with the data. The request may include a function call to a function configured to operate on a first data table and a second data table included in the data. The array of processing nodes may partition the first data table among respective subsets of the processing nodes based on a partition key. The array of processing nodes may distribute the second data table among the partitions based on the partition key. The array of processing nodes may execute the function on the first data table and the second data table at each of the partitions. A method and computer-readable medium may also be implemented.

17 Claims, 7 Drawing Sheets

(56) References Cited

OTHER PUBLICATIONS

NPL2: MapReduce. Title: MapReduce .The Programming Model and Practice. Jun. 19, 2009. pp. 1-71, Jerry Zhao, Jelena Pjesivac-Grbovic.*

NPL3: Join Algorithms using Map/Reduce. Title: Join Algorithms using Map/Reduce. 2010. pp. 1-57, Jairam Chandar.*

* cited by examiner

MULTI-INPUT SQL-MR

CLAIM OF PRIORITY

This application claims the benefit of priority under 35 U.S.C. § 119(e) of U.S. Provisional Patent Application Ser. No. 61/841,295 filed on Jun. 29, 2013, which is hereby incorporated by reference herein in its entirety.

BACKGROUND

1. Technical Field

The present disclosure relates generally to database systems, and in particular, to processing queries in a database system involving database queries that include multi-input map-reduce (MR) functions.

2. Related Art

A database is a collection of stored data that is logically related and that is accessible by one or more users or applications. A popular type of database is the relational database management system (RDBMS), which includes relational tables. Relational database tables include tuples (rows) and attributes (columns). Traditional databases allow a particular query language, such as Structured Query Language (SQL) to be used to carry our various tasks related to the data stored in the database, such as queries. However, as data types and data amounts have increased, traditional database languages have become cumbersome when dealing with voluminous amounts of data even in a massive parallel processing (MPP) system.

Thus, other programming abstractions were implemented in order to query a database in a more complex manner. MapReduce technology allows flexible programming languages such as Java to be used to perform complex analysis of massive databases. The MapReduce programming model allows users to specify a map function that transforms a set of key/value pairs into set of intermediate key/value pairs, and a reduce function that transforms key/value group pairs into a final set of key/value pairs. Instances of the map function operate in parallel on arbitrary partitions of the database. The intermediate key/value pairs are repartitioned by the system so that matching keys are collocated on the same machine where they can be formed into the key/value group pairs input to parallel instances of the reduce function. The MapReduce implementation transparently lifts the map function and reduce function analysis to the full database, freeing the programmer from parallel execution details such as initial data partitioning, parallel task scheduling, fault tolerance, redistribution and grouping of intermediate results over a network, and output of final results. However, unlike traditional SQL database systems, MapReduce provides no built-in general-purpose data processing primitives such as joins, filters, aggregators, and window functions. The MapReduce programmer must implement these primitives as map and/or reduce functions as needed. Moreover, MapReduce does not provide a declarative query language interface and query optimizer like SQL database systems, making a MapReduce analysis difficult to refine (map and/or reduce programs must be modified and recompiled) and MapReduce programs are susceptible to breakage when the underlying database changes (schema changes require map and/or reduce code changes).

SQL-MapReduce (SQL-MR) combines the flexibility of MapReduce with the advantages of SQL database systems. SQL-MR enables a programmer to extend SQL capabilities with map functions (also called row functions) and/or reduce functions (also called partition functions) written in programming languages such as Java or C. A SQL-MR map function transforms a set of rows from an arbitrary partition of an input table into an intermediate set of rows. A SQL-MR reduce function transforms a group of rows that agree on a specified set of partitioning attributes, into another intermediate set of rows. The intermediate rows output from a SQL-MR map function or reduce function may be further operated by other map or reduce functions, or by traditional SQL operators such as filters, joins, aggregators, and window functions. The SQL-MR implementation handles parallel task scheduling, fault tolerance, redistribution and grouping of intermediate results, and other complex aspects of parallel execution, freeing the SQL-MR programmer to focus on the data analysis problem.

SQL-MapReduce (SQL-MR) combines the flexibility of MapReduce with the advantages of SQL database systems. SQL-MR enables a programmer to extend SQL capabilities with map functions (also called Row functions) and/or reduce functions (also called Partition functions) written in programming languages such as Java or C. A SQL-MR map function transforms a set of rows from an arbitrary partition of an input table into an intermediate set of rows. A SQL-MR reduce function transforms a group of rows that agree on a specified set of partitioning attributes, into another intermediate set of rows. The intermediate rows output from a SQL-MR map function or reduce function may be further operated by other map or reduce functions, or by traditional SQL operators such as filters, joins, aggregators, and window functions. The SQL-MR implementation handles parallel task scheduling, fault tolerance, redistribution and grouping of intermediate results, and other complex aspects of parallel execution, freeing the SQL-MR programmer to focus on the data analysis problem.

While SQL-MR has provided greater flexibility and depth to processing voluminous types and amounts of data, each function has operated on a single input. Many real-world analytic problems require complex cross-analysis of two or more data sets. Enhancing SQL-MR to allow a single function to operate on multiple-input tables provides a multi-dimensional layer of data analysis not typically provided by SQL-MR.

SUMMARY

According to one aspect of the disclosure, a system may include an array of storage devices configured to store a data. The system may further include an array of processing nodes in communication with the array of storage devices. The array of processing nodes may receive a request to perform at least one task associated with the data. The request may include a function call to a function configured to operate on a first data table and a second data table included in the data. The array of processing nodes may partition the first data table among respective subsets of the processing nodes based on a partition key. The array of processing nodes may distribute the second data table among the partitions based on the partition key. The array of processing nodes may execute the function on the first data table and the second data table at each of the partitions.

According to another aspect of the disclosure, a computer-implemented method executable by a plurality of processing nodes. The method may include receiving a request to perform at least one task associated with data in a storage device. The request may include a function call to a function configured to operate on a first data table and a second data table included in the data. The method may further include retrieving a plurality of data tables from at least one storage device. The method may further include partitioning a first one of the plurality of data tables among respective subsets of the processing nodes based on a partition key. The method may further include distributing other data tables of the plurality of data tables among the partitions according to the partition key. The method may further include executing the function on the plurality of data tables at each of the partitions.

According to another aspect of the disclosure, a non-transitory computer-readable medium may be encoded with a plurality of instructions executable by a processor. The plurality of instructions may include instructions to receive a request to perform at least one task associated with data stored in at least one storage device. The request may include a function call to a function configured to operate on a first data table and a second data table included in the data. The plurality of instructions may further include instructions to retrieve the first data table and the second data table from the at least one storage device. The plurality of instructions may further include instructions to partition the first data table among respective subsets of the processing nodes based on a partition key. The plurality of instructions may further include instructions to distribute the second data table among the partitions according to the partition key. The plurality of instructions may further include instructions to execute the function on the first data table and the second data table at each of the partitions.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1:
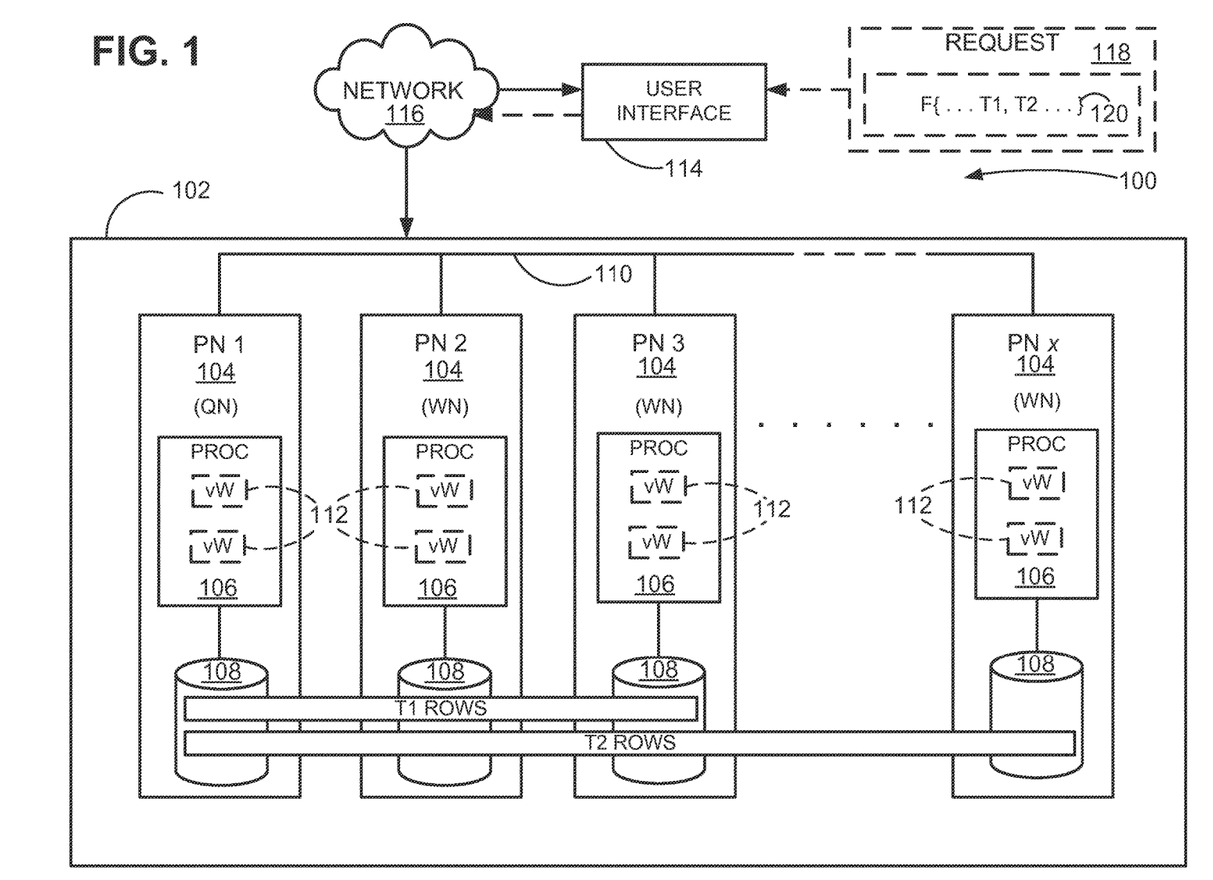
FIG. 1 is a block diagram of an example database system.

FIG. 1 is a diagrammatic representation of example architecture for a database system 100. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memories, etc.). In the example of FIG. 1, the RBDMS 102 may be a massive parallel processing (MPP) system having an array of processing units and distributed memory and storage. In alternative examples, the RBDMS 102 may implement a single processing unit, such as in a symmetric multiprocessing (SMP) system configuration.

The RBDMS 102 may include one or more processing nodes (PN) 104 used to manage the storage, retrieval, and manipulation of data in a database. In FIG. 1, the processing nodes 104 are individually indexed as PN 1 through PN x, where x may represent the total number of processing nodes 104 in the database system 100 or, alternatively, may represent the total number of active processing nodes 104 in the database system 100.

Each of the processing nodes 104 may include one or more processor arrays 106 and one or more storage devices 108. The storage devices 108 may include both persistent and non-persistent storage. The persistent storage may contain disk drives, flash drives, or any combination of persistent storage devices. The non-persistent storage may include computer-readable storage media or memories, such as a cache, buffer, RAM, removable media, or other computer-readable storage media. Computer-readable storage media may include various types of volatile and nonvolatile storage media. Processor arrays 106 may include one or more processors that include one more processing cores. Each processor array 106 may execute multiple processing cores during operation. Various processing techniques may be implemented by processors of the processor arrays 106, such as multiprocessing, multitasking, parallel processing and the like, for example.

Each of the processing nodes 104 may communicate with one another through a communication bus 110. The communication bus 110 allows communication to occur within and between each processing node 104. For example, implementation of the communication bus 110 provides media within and between each processing node 104 allowing communication among the various processing nodes 104 and other component processing units. The communication bus 110 may be hardware, software, or some combination thereof. In instances of at least a partial-hardware implementation of the communication, the hardware may exist separately from any hardware (e.g., processors, memory, physical wires, etc.) included in the processing nodes 104 or may use hardware common to the processing nodes 104. In instances of at least a partial-software implementation of the communication bus 110, the software may be stored on one or more of the storage devices 108 (persistent and/or non-persistent) of the processing nodes 104 and executed on one or more of the processor arrays 106 or may be stored and executed on separate memories and processors that are in communication with the processing nodes 104. In one example, the communication bus 110 may include multi-channel media such that if one channel ceases to properly function, another channel may be used. Additionally or alternatively, more than one channel may also allow distributed communication to reduce the possibility of an undesired level of communication congestion among processing nodes 104.

The storage devices 108 may include various types of persistent storage devices with varying degrees of performance. Such degrees of performance may involve how quickly data can be retrieved from a particular storage device 108. In conventional databases, retrieval time of data is a crucial aspect of overall performance. Thus, it is more efficient to store database data most likely to be accessed with greater frequency than other database data in storage devices that allow faster retrieval.

In one example, each processor array 106 may execute one or more virtual worker modules (vWorkers) 112 designated as "vW" in FIG. 1. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. Each vWorker 112 may represent a virtual processor (vproc) and/or physical processors. In the case of virtual processors, each vWorker 112 may be executed by one or more physical processors, such as those that may be included in the processing nodes 104. For example, in FIG. 2, the vWorkers 112 of a respective processing node 104 may each be executed as one or more virtual processors by physical processors of the processor array 106 included in the respective processing node 104. In one example, during operation, the one or more physical processors of the processor arrays 106 included in the processing nodes 104 may execute a number of vWorkers 112 by switching between the executions of the various vWorkers 112 at a rapid rate allowing the vWorkers 112 to substantially operate in "parallel."

In one example, data may be stored in table format in the storage facilities 108. Various types of data may be stored, such as arrays, lists, video, audio, etc. Each vWorker 112 may be associated with a respective logical region of storage in the storage facilities 108. As rows are loaded and stored in the storage facilities 108, the vWorkers 112 may be associated with the particular rows in the respective region. Thus, when rows are initially processed, the vWorkers 112 may retrieve and/or otherwise manipulate the rows stored in the respective region. In this configuration, the vWorkers 112 are solely responsible for action on the rows in the respective logical regions, providing a "shared nothing" architecture where no two vWorkers 112 share the same respective logical region of the storage facilities sharing the rows.

During operation, the database system 100 may receive various database queries through at least one user interface 114. The user interface 114 may represent any system, such as a computer system, that allows communication with the RBDMS 102. In one the example, the user interface 114 may communicate with the RBDMS 102 through a network 116. The network 116 may be wired, wireless, or some combination thereof. The network 116 may be a virtual private network, web-based, directly-connected, or some other suitable network configuration. In one example the database system 100 may process queries of various query languages, such as structured query language (SQL). The database system 100 may be extended to receive single input SQL-MapReduce (SQL-MR) functions, such as those described in U.S. Pat. No. 7,966,340, which is hereby incorporated by reference herein in its entirety. Allowing SQL-MR functions to be executed by the database system 100 allows extended functionality beyond that which traditional SQL provides. For example, through the use of SQL-MR, more sophisticated algorithms and operations may be used, such as those developed in Java and C, for example.

In one configuration, parallel processing of queries involving SQL-MR functions allows these sophisticated algorithms and operations to be processed at acceptable response times. In order to orchestrate this parallel processing, one of the processing nodes 104 may serve as a queen node QN, while the other processing nodes may serve as a worker node (WN). In FIG. 1, processing node PN 1 serves as the queen node QN, while the processing nodes PN 2 through PN x serve as the worker nodes WNs. When a query, such as query 118 is received by the database system 100, the queen node QN may receive the query 118 and formulate the plan to carry out the execution of responding to the query, while the worker nodes WNs are each tasked by the queen node QN to perform at least some of the execution necessary to form a proper response to the query.

In one example, the query may contain a multi-input SQL-MR function 120. In one example, a SQL-MR function may be considered "multi-input" if the SQL-MR function relies on multiple input tables. The function 120 may be a multi-input map function with optional dimension inputs or a multi-input reduce function with optional dimension inputs. The query 118 is shown to include a function 120 with at least two input tables T1 and T2. However, the multi-input processing functionality of the database system 100 is not limited to two input tables and may allow any number of input tables in a multi-input SQL-MR function. The query 118 may be received and processed by the queen node QN.

As conceptually indicated in FIG. 1, the rows of tables T1 and T2 may be stored among the storage facilities 108 of various processing nodes 104. For example, rows of table T1 are stored in the storage facilities of processing nodes PN 1-PN 3, while the rows of table T2 are stored among all the storage facilities 108 of the processing nodes 104. The conceptual illustration is for example purposes only and database tables T1 and T2 and/or other database tables may be stored among the storage facilities 108 in any number of proportions.

As the database system 100 processes the multi-input SQL-MR function 120, the database system 100 may recognize the multi-input nature of the function 120 as either a multi-input map function or a multi-input reduce function, both of which may also include an optional dimension input, or a single-input map or reduce function with dimensional input. In the scenario of a multi-input map function or multi-input reduce function, the database system 100 may perform a "co-grouping" of rows of tables involved in the multi-input SQL-MR function 120. "Co-grouping" may refer to table rows of multiple input tables being similarly partitioned to a common set of vWorkers 112, where the similar partitions are further grouped and combined by the vWorkers 112 using a specified common key, which may be derived from values of particular attributes contained in the corresponding input tables. For example, each vWorker 112 may process a respective partition based on a common key, such as two columns from different tables that share a common domain.

In the scenario of a multi-input map function, the database system 100 may perform an arbitrary co-grouping of rows of tables involved in the multi-input SQL-MR function 120. The arbitrary co-grouping may refer to table rows of multiple input tables being arbitrarily partitioned to a common set of vWorker 112, wherein the arbitrary partitions are further grouped into a single group that are then combined by the vWorkers 112.

One or more dimension inputs may also be provided as input in the scenario of a multi-input map function or multi-input reduce function (as well as single-input map or reduce functions). In such cases, co-grouping may further refer to replicating dimension inputs (tables) to the common set of vWorkers 112 chosen to receive co-partitions, and the subsequent combining of replicas with partitions by the vWorkers 112. In situations in which the dimension input is implemented in a single-input map or reduce function (thereby making the input "multi-input"), the co-grouping degenerates into a group operation. Co-grouping allows the parallel processing nature of the database system 100 to efficiently process any number of multiple-inputs in a SQL-MR function.

Figure 2:
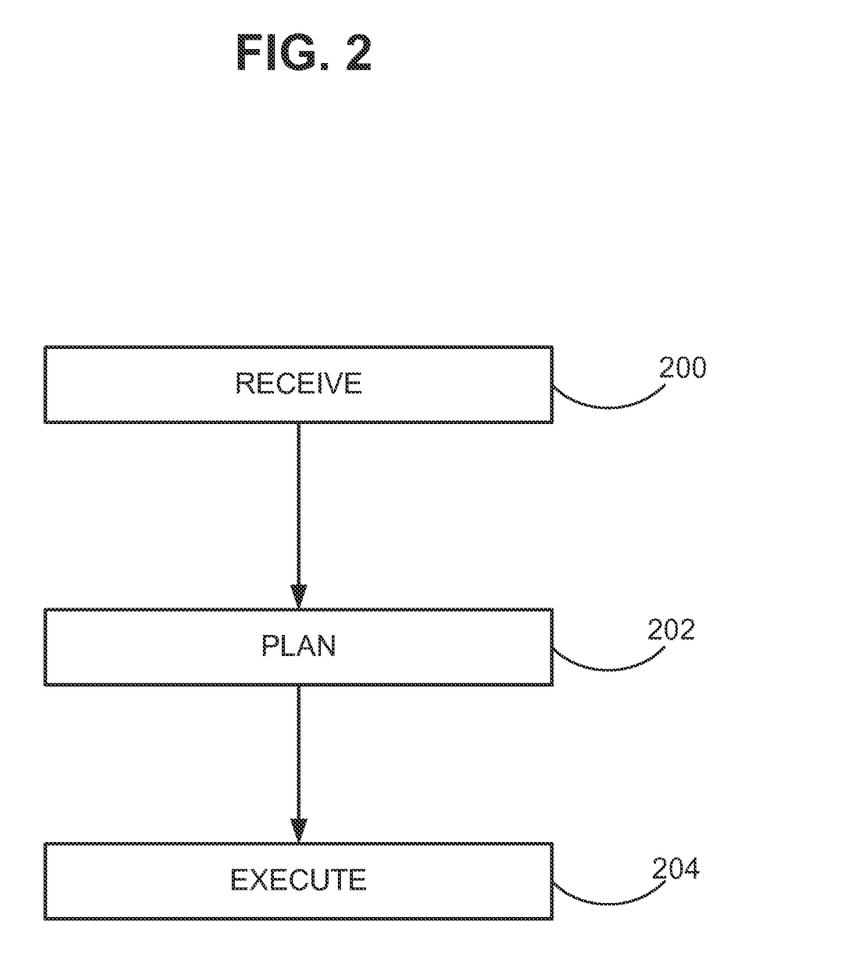
FIG. 2 is a flow diagram of an example operation of a database during the processing of a multi-input a SQL-MR function.

FIG. 2 shows a flow diagram of an example manner in which the multi-input SQL-MR function 120 may be processed. In a receiving phase (200), the query 118 may be received by the queen node QN. The queen node QN identifies the query as containing multi-input SQL-MR function and classifies the multi-input SQL-MR function as a multi-input map function or multi-input reduce function. The queen node QN may also determine if the multi-input SQL-MR function has dimension inputs. The queen node QN may then begin a planning phase (202). In one example, the planning phase 202 may be affected by the particular type of the multi-input SQL-MR function. During the planning phase 202, the queen node QN may determine how input database tables are to be partitioned/replicated among the vWorkers 112 when receiving a multi-input SQL-MR function. This may include considerations of the nature of the SQL-MR function, current distribution of input database tables, the number of rows each input table includes, and the cost associated with repartitioning already-partitioned tables. Once partitioning decisions have been made, an execution phase may be implemented (204). In one example, the queen node QN may partition and/or replicate rows of the input tables to a selected set of vWorkers 112. The vWorkers 112 may then implement a co-group operation where local partitions and replicas are combined in order to facilitate the processing of the function 120. Once the local SQL-MR function 120 has operated on the co-grouped data, output rows may then be processed further by the vWorker 112 as per any remaining steps in the execution plan for the query, or sent to the queen node QN for completion of any query that included the multi-input SQL-MR function.

In one example the formal multi-input SQL-MR syntax received by the queen node QN in FIG. 2 may be described as follows.
SELECT . . . FROM <function name><on clause><function arguments>*
<on clause>:=<map input>+<dimension input>*|<reduce input>+<dimension input>*
<map input>:=<table input>PARTITION BY ANY [<order by>]
<reduce input>:=<table input>PARTITION BY<partitioning attributes>[<order by>]
A dimensional input clause may be defined as:
<dimension input>:=<table input>DIMENSION <order by>
The <table input> clause may defined as follows:
ON<table expression>[AS<alias>]

The SQL-MR function invocation includes specification of the function name <function name>, specification of one or more table inputs <on clause>, and specification of any function-specific arguments (<function arguments>) that may indicate the particular functional operations to be carried out by the particular function 120. The SQL-MR function type may be recognized by the choice of ON clause (<on clause>). A map function ON clause may specify one or more map inputs followed by zero or more dimension inputs (<map input>+<dimension input>*) whereas a reduce function may specify one or more reduce inputs followed by zero or more dimension inputs (<reduce input>+<dimension input>*).

Figure 3:
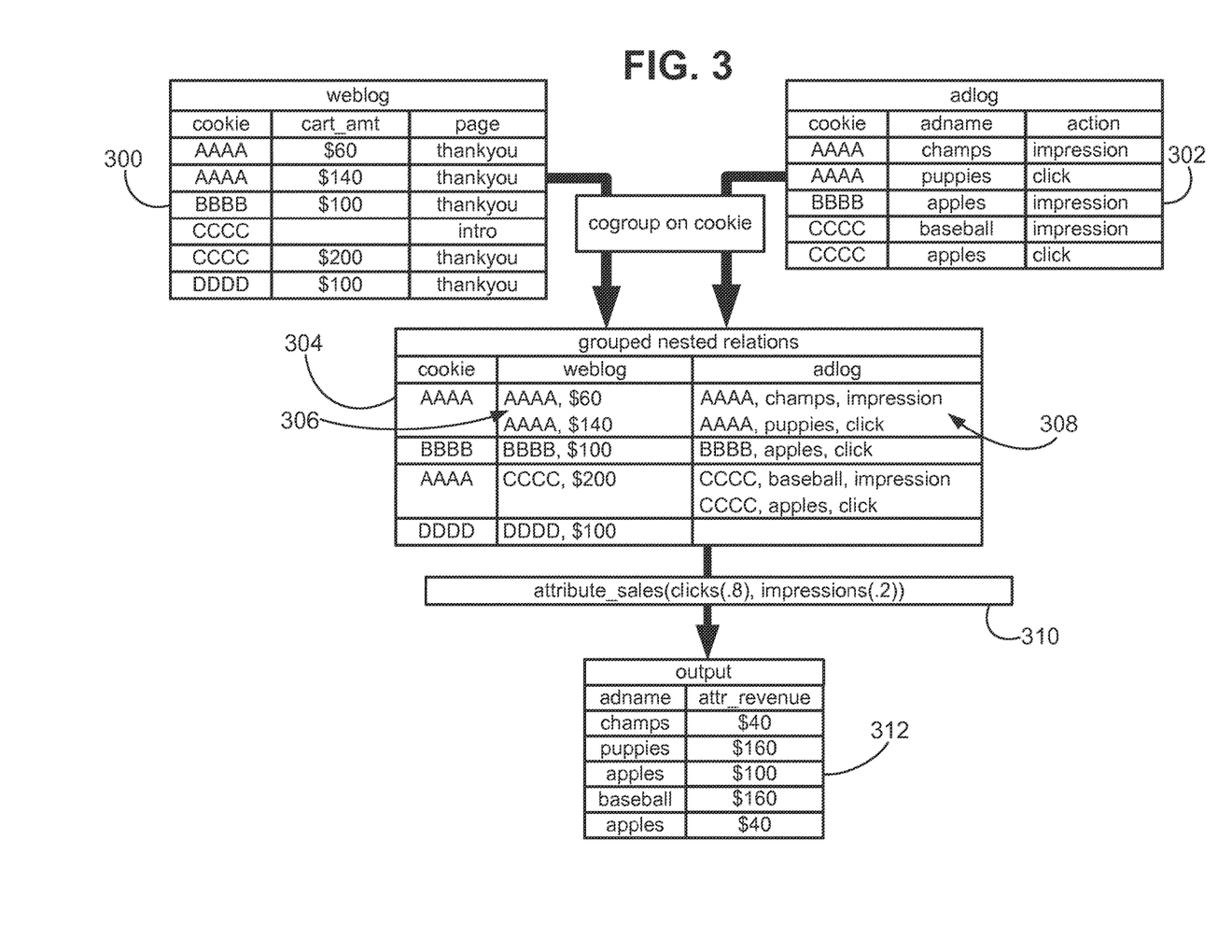
FIG. 3 is an example of database table processing for a multi-input SQL-MR function.

The planning phase 202 and execution phase 204 of the SQL-MR function 120 performed depends on the SQL-MR function type. The ultimate goal in both cases is to form from the input tables a "combined grouped table" on each vWorker 112 of a selected set of vWorkers 112. The combined grouped table represents a data structure that includes the grouped rows from each input table organized according to the particular partitioning set forth by the multi-input SQL-MR function 120. The vWorkers 112 iteratively invoke the SQL-MR function 120 in parallel, providing a single row of the combined grouped table to the function 120 at each invocation FIG. 3 is a diagram providing an example of how database tables are processed during a multi-input reduce function. In one example, a query involving a SQL-MR multi-reduce function may provide:
SELECT adname, attr_revenue
FROM attribute_sales(
  ON(SELECT cookie, cart_amt
    FROM weblog
    WHERE page='thankyou' as W
PARTITION BY cookie
ON adlog as A
PARTITION BY cookie
CLICKS(.8)
IMPRESSIONS(0.2))

This SQL-MR multi-input reduce function ("attribute_sales") is implemented to distribute revenue generated from an Internet purchase differently to click ads and web-based impression advertisements (ads) based on the percentages provided by the CLICKS (80%) and IMPRESSIONS (20%) arguments, respectively. In this example, the reduce function "attribute_sales" uses the tables "weblog" and "adlog" as inputs. The weblog table 300 includes three "columns", "cookie", "cart_amt", and "page". The "cookie" column represents a particular web cookie to identify a particular user. The "cart_amt" column indicates the value of an item(s) purchased through a webpage. The "page" column indicates the final page reached by a particular user. The "adlog" table 302 also includes a "cookie" column, as well as an "adname" column and "action" column. The "adname" column includes the name of a particular ad viewed by a user and "action" column indicates if the ad was an impression ad or a click ad.

In order to determine how the revenue is to be distributed, the information in both the "weblog" 300 and "adlog" tables 302 must be analyzed to determine such desired information. The function "attribute_sales" uses both tables 300 and 302. As indicated in the PARTITION BY clause of the reduce inputs, the input tables must be co-grouped on the "cookie" column, which includes values of the same attribute domain. FIG. 3 provides an illustration of the data and processing state of at least one vWorker 112 after the input tables have been partitioned by the queen node QN on the "cookie" attribute. In particular, FIG. 3 illustrates (1) input table partitions of the "weblog" table 300 and "adlog" table 302 assigned to the vWorker 112 by the queen node QN, (2) the combined grouped table 304 formed by grouping and combining the assigned input table partitions, and (3) the output 312 of the "attribute_sales" function after application of the function to each row of the combined grouped table 304. The combined grouped table 304 has one row per unique value of the "cookie" column occurring in either of the input tables, as shown in the "cookie" column. A given row in the combined grouped tables table 304 contains any rows from the "weblog" table 300 and "adlog" table 302 respectively that match the corresponding value in the "cookie" column. As indicated by the combined grouped tables 304, even the "cookie" column values such as "DDDD" in FIG. 4 that do not have corresponding rows in the both the input tables 300 and 302 may be included in the combined grouped tables table 304.

After the co-groupings are completed to fully form the combined grouped table 304, each row of the combined group table 304 may be evaluated according to the function "attribute_sales". In such a scenario, row iterators may be implemented to give the function access to the nested rows for a particular "adlog" or "weblog" grouping when it is invoked. For example, in the combined grouped tables 304, row values 306 from the "weblog" table 300 are grouped by "cookie" column values. The row values 306 from the "weblog" table 300 associated with the first "cookie" column value "AAAA" may be accessed by the function one row at a time through the row iterators. Similarly, the first group of row values 308 from the "adlog" table 302, those associated with cookie value "AAAA" may be accessed by yet another row iterator. Once the "AAAA" row of the combined grouped tables 304 is evaluated, the next row of the row of the combined grouped table 304, corresponding to "cookie" column value "BBBB" may be evaluated by the function. At each invocation, the "attribute_sales" function totals the purchase amounts from the "cart_amt" column, which contains rows from the "weblog" table 300 and attributes an equal share of 80% of the total to any click ads for the current session (cookie) and attributes an equal share of the remaining 20% of the total amount to any impression ads for the current session at operation 310. The output table 312 has one row per nested "adlog" table 302 row per "cookie" value. The first two rows of the output table 312 correspond, respectively, to the "champs" impression ad and the "puppies" click ad associated with the "AAAA" session. Note that 20% of the $200 in total revenue was attributed to the former and 80% of the $200 total was attributed to the latter, as prescribed by the arguments of the function.

Figure 4:
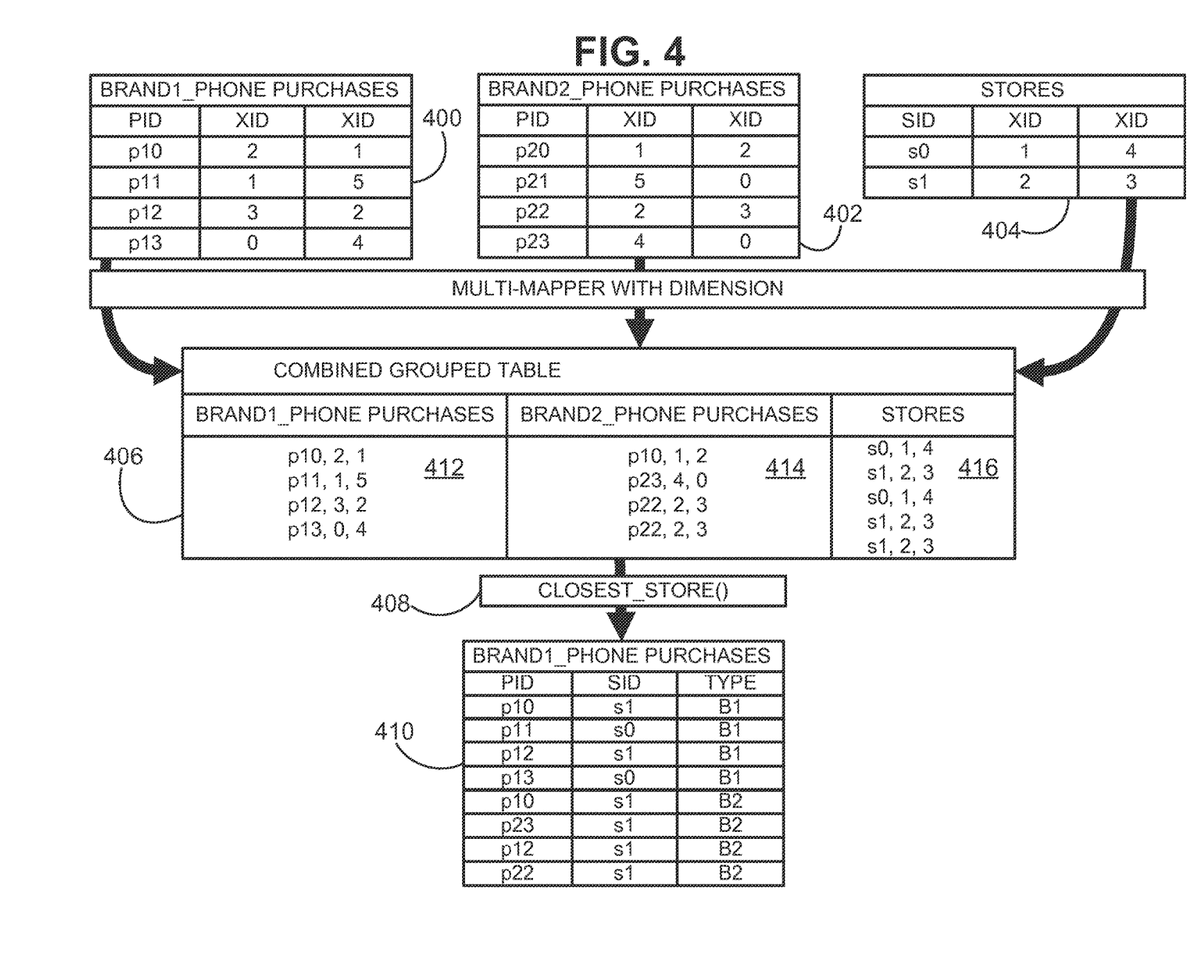
FIG. 4 is another example of database table processing for a multi-input SQL-MR function.

FIG. 4 is a diagram providing an example of how database tables are processed during a multi-input map function with a dimension input. In one example, a query involving a SQL-MR multi-input map function with a dimensional input may provide:

SELECT pid, sid
FROM closest_store (
  ON brand1_phone_purchases as P1 PARTITION BY ANY
  ON brand2_phone_purchases as P2 PARTITION BY ANY
  ON stores AS S DIMENSION)

This SQL-MR multi-input map function with dimension input query may be used to locate the store that is in closest proximity when a purchase was made with a phone of either of two brands. In this example, the "brand1_phone_purchases" table 400 contains a log of purchases that were made with phones of one brand, while the "brand2_phone_purchases" table 402 contains a log of purchases made with phones of yet another band. Both purchase log tables 400 and 402 includes a purchase ID column "pid", as well as geographical coordinate data that includes an x-coordinate column "xid" and a y-coordinate column "yid" of a given phone when a purchase was made. The "stores" table 404 may include a store identification column "sid", as well as geographical coordinates of the store, which includes an x-coordinate column "xid" and a y-coordinate column "yid".

The function "closest_store" uses all three tables in order to determine the closest_store for each purchase. FIG. 4 provides an illustration of the data and processing state of at least one vWorker 112 after the input map tables have been arbitrarily partitioned and the dimension table replicated by the queen node QN. In particular, FIG. 4 illustrates (1) arbitrary partitions of the "brand1_phone_purchases" table 400 and "brand2_phone_purchases" table 402 that were assigned to the vWorker 112 by the queen node QN, as well as a full replica of the "stores" table 404 (2) the combined grouped table 406 formed by grouping and combining the assigned input table partitions and replicas and (3) the output 410 of the "closest_store" function after application 408 of the function to the single row of the combined grouped table.

After the co-groupings are completed to fully form the combined grouped table 406, the input table row grouping may be evaluated according to the function "closest_store." In such a scenario, row iterators may be implemented to give the function access to the nested rows for particular "brand1_phone_purchases", "brand2_phone_purchases", or "stores" grouping when it is invoked. For example, in the combined grouped tables 406, row values 412 from the "brand1_phone_purchases" table 400 arbitrary table partition may be accessed by the function one row at a time through the row iterators. Similarly, the first group of row values 414 from the "brand2_phone_purchases" table 402 partitions and the "stores" table replica 416 and the may be accessed using row iterators. At each invocation, the "closest_store" function iterates through each row from the "stores" replica for each row of the "brand1_phone_purchases" table 400, and for each row of the "brand2_phone_purchases" 402 table in order to determine, for each phone purchase of either brand, the store with the minimal Euclidean distance between the store geographic coordinate and the phone purchase geographic coordinate. The output table 410 includes one row phone purchase, with the "pid" column of that table providing the purchase ID, the "sid" column provide the ID of the closest_store at the point of that purchase, and the "Brand" column the brand of phone used to make the purchase.

Figure 5:
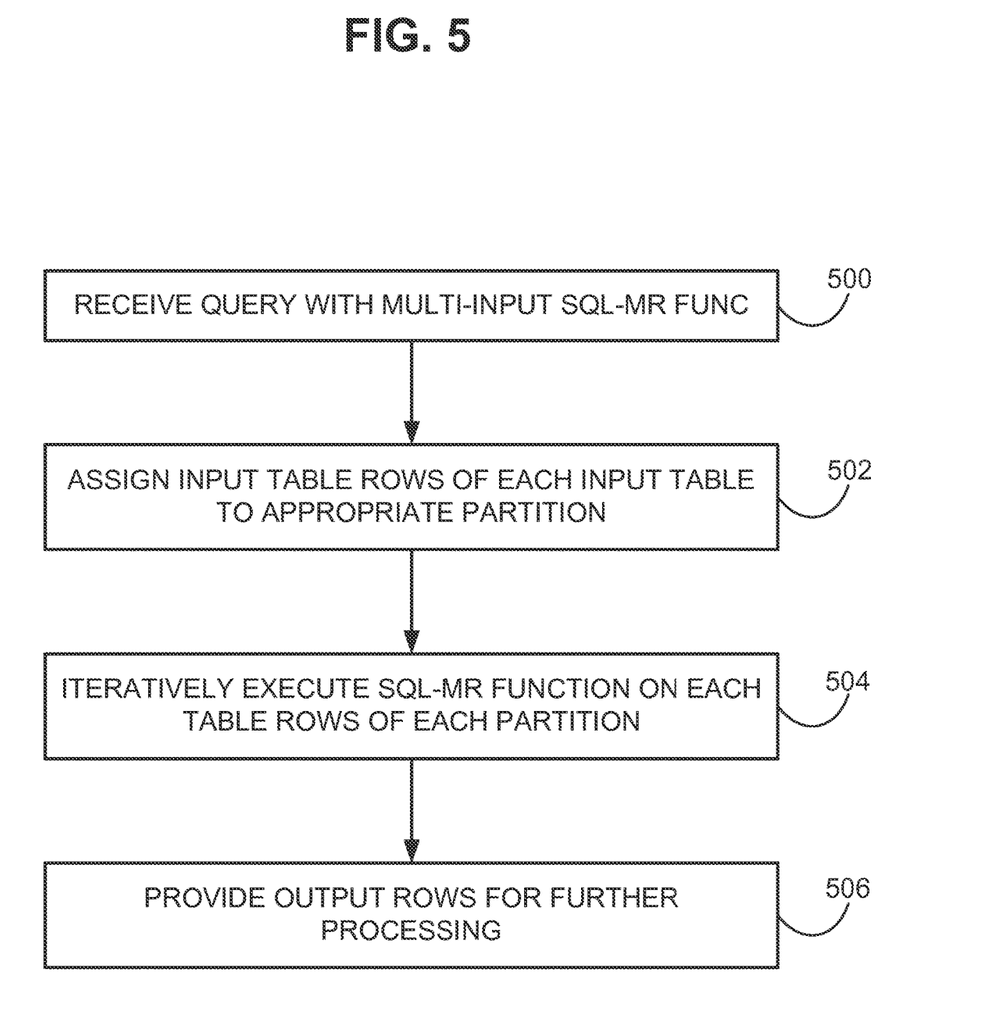
FIG. 5 is an operational flow diagram of example operation of a database system processing a multi-input SQL-MR function.

FIG. 5 is an example operational flow diagram of processing and executing of a multi-input SQL-MR function by the database system 100. In one example, a query including a multi-input SQL-MR function, such as the query 118, may be received by the database system (500). The queen node QN may be responsible for the initial reception of the query 118. The table rows of the input tables included in the multi-input SQL-MR function 120 may be assigned to a partition in order to execute the function 120 (502). Based on the contents of the multi-input SQL-MR function 120, the queen node QN may determine the manner in which input tables included in the multi-input SQL-MR function are to be partitioned/replicated and utilize the worker nodes WN to partition and/or replicate the input tables. After partitioning/replication has taken place, the SQL-MR function 120 may be iteratively executed row-by-row on partitioned and/or replicated tables rows of the input tables for each partition (504). The output rows may be provided by each worker node WN to be further processed by another the SQL-MR function or the overlying query 118 (506).

Figure 6:
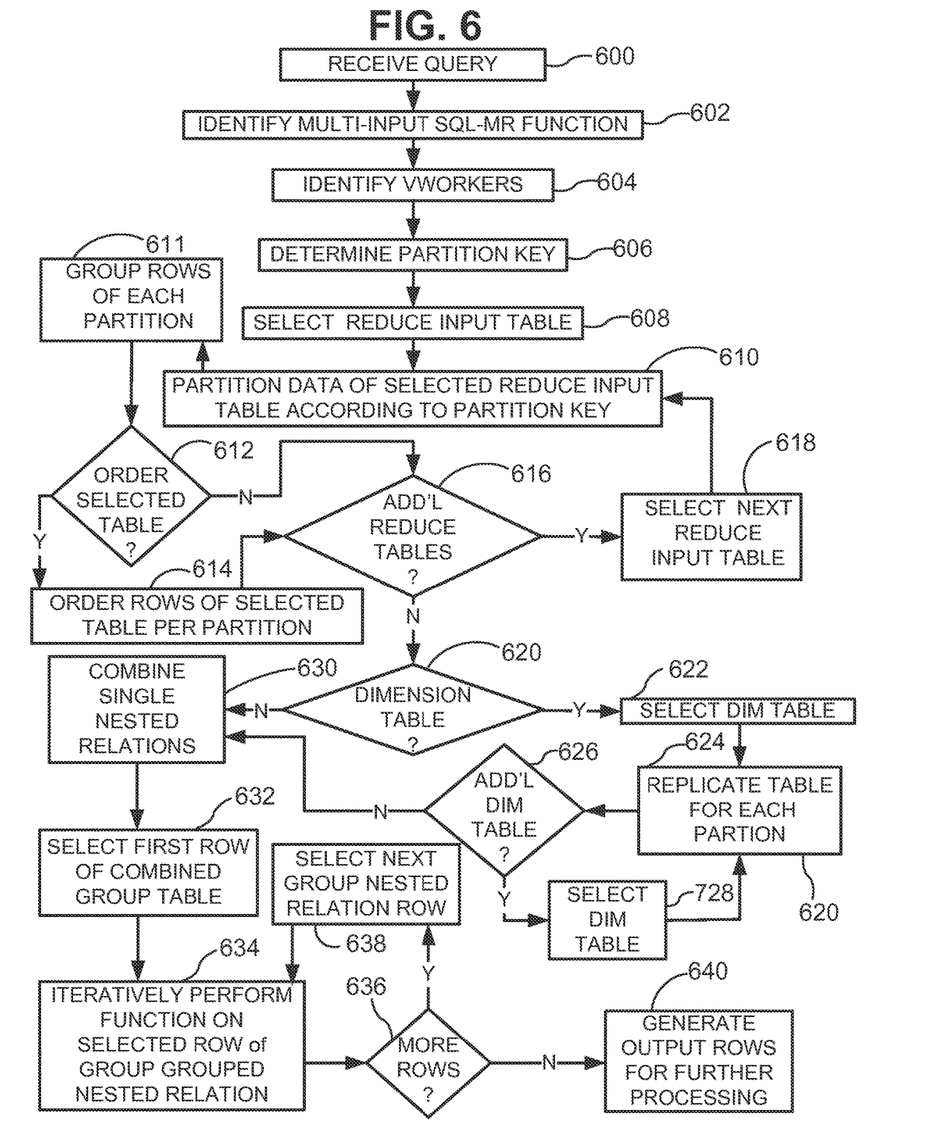
FIG. 6 is an operational flow diagram of example operation of a database system processing a multi-input SQL-MR reduce function with possible dimension input.

FIG. 6 is an example operational flow diagram of a multi-input reduce function being processed in a database system, such as the database system 100. In one example, a query containing a multi-input reduce function, such as the query 118, which may include a single-input reduce function with a dimension table, may be received by the database system 100 (600). The database system 100 may identify the multi-input SQL-MR function 120 included in the query 118 (602). This identification may be performed by the queen node QN. In one example, multi-input SQL-MR functions, whether user-defined or system-based, may be previously received by the database system 100 and stored in a library (not shown) of the database system 100. Upon identification of the multi-input SQL-MR reduce function 120, the queen node QN in the planning phase 202 may determine the specific set of vWorkers 112 on which the reduce function 120 will be executed (604), along with the partition key for each reduce input (<reduce input>) (606), which may represent a subset of the partitioning attributes (<partitioning attributes>) the function 120 requests the associated reduce input table to be partitioned.

A reduce input table may be selected by the queen node QN for partitioning (608). The queen node QN may orchestrate the partitioning of the rows using the selected partitioning key of the reduce input table to the selected set of vWorkers 112, which may include a vWorker 112 responsible for receiving the input table rows associated with the particular partition (610). The partitioning operation may be implemented using a hash function applied to the partitioning key, with the result of hash function used as an index into an array of vWorker 112 addresses. The vWorker 112 may group the respective table rows of the input table into a single nested relation according to the full set of partitioning attributes specified by the reduce input (611). If the reduce input specifies an order by clause (<order by>) (612), rows contained in each nested relation will be sorted according to the requested order (614). The queen node QN may determine if other reduce input tables are used in the function 120 (616). If so, the next reduce input table may be selected (618) and the table rows may be partitioned to the selected set of vWorkers 112 (610), and grouped and ordered into a single nested relation according to the full set of partitioning attributes (611). This may continue until there are no other reduce input tables to partition, group, and order. Any subset of the partitioning attributes specified by a reduce input can be used by the queen node QN to form the partitioning key used to partition reduce input tables to vWorkers 112; however, the selected subset of attributes must be aligned across each of the inputs such that if the attribute in position "k" of the partitioning specification (<partition by>) is used in the partitioning key of the first reduce input, the corresponding attribute "k" will be used in the partitioning key for all other reduce inputs. The arity and data types of the specified partitioning attributes (<partition attributes>) must match for all reduce inputs of a multi-input reduce function.

After the reduce input tables are processed, the queen node QN may also determine if any dimension tables (<dimension table>) are included in the function 120 (620). If so, the dimension table is selected (622) and replicated to each of the selected set of vWorkers 112 operating on a partition (624). Thus, the dimension table is replicated to each reduce input partition. The queen node QN may determine if any other dimension tables are included (626). If so, the next dimension table is selected (628) and replicated across partitions (624).

Once any and all dimension tables have been replicated, each vWorker 112 may combine all single nested relations into a combined grouped table (630). This may include that nested relations corresponding to reduce inputs are combined using n-way full outer join operation that equates corresponding partitioning attributes. Unlike a traditional relational join operation NULL values compare equal. The combining process might also include performing a Cartesian product join to combine each replicated dimension table with the full outer join result, forming each the final combined grouped table on which the multi-input reduce function is iteratively invoked.

Note that because of the full outer join semantics used to join the reduce inputs, the nested relation input to the function may have a row for each unique combination of partitioning attributes present in any of the reduce inputs. If a given input has no rows for a particular combination of partitioning attributes then the row corresponding to that combination of partitioning attributes has an empty nested relation for that input. For example, see the rows associated with the partition for DDDD in FIG. 3. Inner Cartesian product semantics are used to combine dimension inputs; consequently, the function is not invoked in the case where all of the reduce inputs are empty. The n-way full outer join and Cartesian join may be implemented using a sort-merge join operation and nested-loops operation respectively.

Once the combined grouped tables are formed in parallel by each vWorker 112, the first row of the combined grouped table may be selected by each vWorker 112 in parallel (632), which corresponds to a single multi-input partition. An example of a combined grouped table is shown in FIG. 3 (combined group table 304). The multi-input reduce function may be performed iteratively by each vWorker 112 in parallel on each row of the combined grouped table for a particular partition (634). After each row of the combined grouped table is processed by the function 120, the vWorker 112 may determine if more rows of the combined grouped tables exists (636). If so, the next row of the combined grouped tables is selected (638) and the function is again iteratively performed respectively on each row group in the selected row of the combined grouped table (634). As previously described, row iterators may be implemented to give the function access to the nested rows for particular when it is invoked on a given row of the combined grouped relation. If no more groups exist, the output rows resulting through iterative application of the function 120 may be generated for further processing by some other SQL-MR function and/or the query 118 (640).

Figure 7:
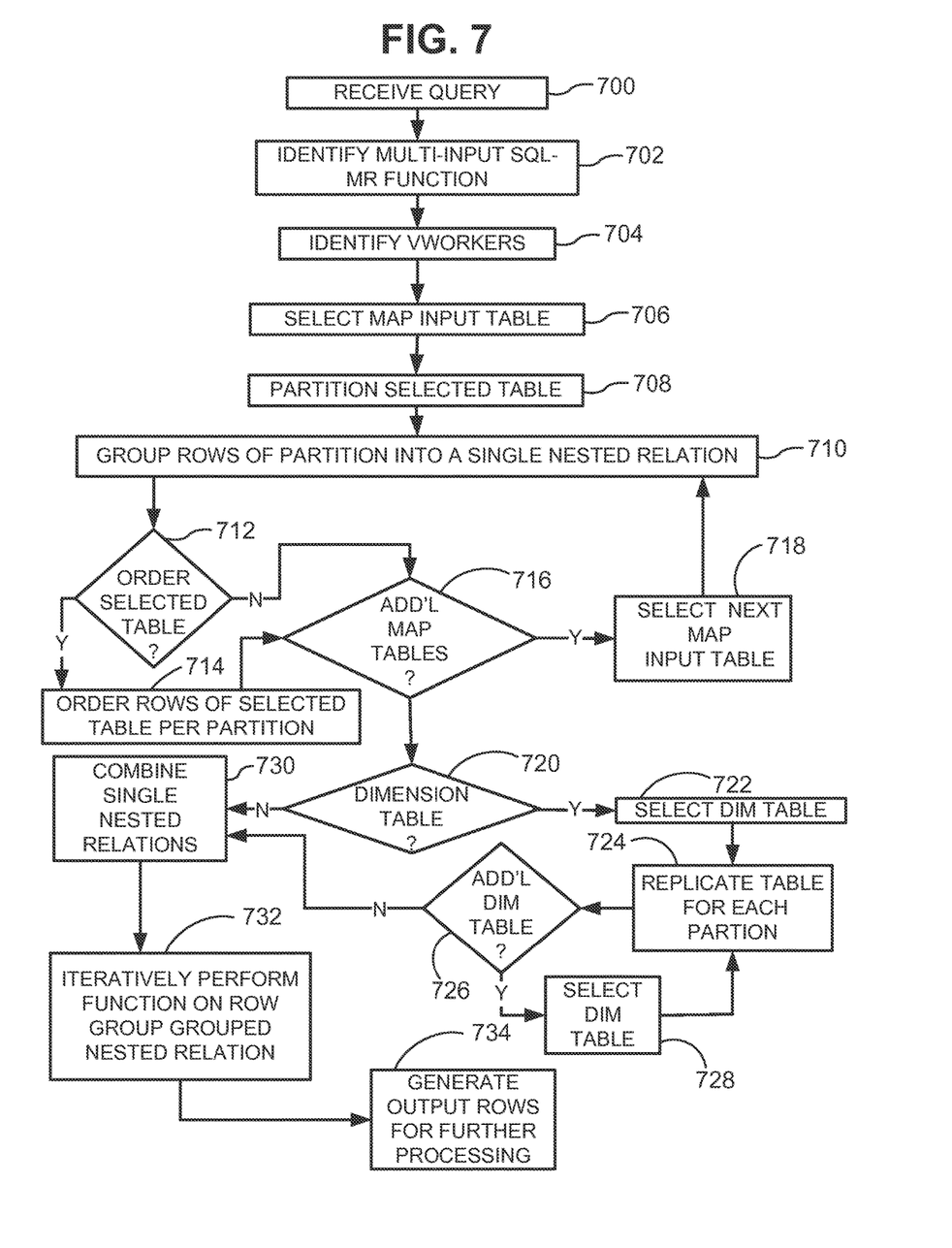
FIG. 7 is an operational flow diagram of example operation of a database system processing a multi-input SQL-MR map function with possible dimension input.

FIG. 7 is an example operation flow diagram of a multi-input map function being processed in a database system, such as the database system 100. In one example, a query, such as the query 118, containing a multi-input map function, which may also be a single-input map function with a dimension table, may be received by the database system 100 (700). The database system 100 may identify the multi-input map SQL-MR function included in the query 118 (702). This identification may be performed by the queen node QN. In the one example, multi-input map SQL-MR functions, whether user-defined or system-based, may be previously received by the database system 100 and stored in a library (not shown) of the database system 100. Upon identification of the multi-input SQL-MR map function 120, the queen node QN, during the planning phase 202, may determine the specific set of vWorkers 112 on which the map function will be executed (704), which may include the common set of vWorkers 112 on which the map input tables (<map input>) to the function are already partitioned in the case where all map input tables are collocated. A map input table may be selected by the queen node QN for partitioning (706). The queen node QN may orchestrate the arbitrary partitioning of the rows of the selected map input table to the selected set of vWorkers 112, which may include a vWorker 112 responsible for receiving the input table rows associated with the particular arbitrary partition (708). The vWorker 112 may group the respective table rows of the received arbitrary input table partition into a single nested relation such that all rows of the arbitrary partition are grouped into a single row of the single nested relation (710). If the map input specifies an order by clause (<order by>) (712), rows contained in each nested relation will be sorted according to the requested order (714). The queen node QN may determine if other map function input tables are used in the function 120 (716). If so, the next map input table may be selected (718) and the table rows may be arbitrarily partitioned to the selected set of vWorkers 112 (708), and further grouped and ordered by each vWorker 112 into a single nested relation (710). This may continue until there are no other map function map input tables to partition and group. The queen node QN may alternatively decide not to arbitrarily partition any of the selected input in the case where the selected group of vWorkers 112 is the same as the common set of vWorkers 112 on which the map input tables are already collocated. In this case, each map input table is grouped and ordered into single nested relations by each vWorker without a queen node QN partitioning step.

The queen node QN may also determine if any dimension input (<dimension input>) tables are included in the function 120 (720). If so, the dimension table is selected (722) and replicated to each of the selected set of vWorkers 112 operating on a partition (724). Thus, the dimension table is replicated to each map input partition. The queen node QN may determine if any other dimension tables are included (726). If so, the next dimension table is selected (728) and replicated across the selected set of vWorkers 112 operating on partitions (724). Once any and all dimension tables have been replicated, each vWorker 112 may, in parallel, form a combined grouped table by combining all single nested relations tables with replicated dimension tables into a combined grouped table. A full outer Cartesian product is used to combine the single nested group tables corresponding to the map inputs, while an inner Cartesian product is used to combine the dimension inputs (730). The full outer Cartesian product is used to combine map input partitions so that the function is invoked when at least one map input partition is non-empty. Once the combined grouped table is formed, the multi-input map function may be iteratively invoked in parallel by each vWorker 112, with the single row of the combined grouped table provided as input (there is only one per vWorker 112, if any) (732). Row iterators may be implemented to give the function access to the nested rows corresponding to particular map input or dimension input when it is invoked on a given row of the combined grouped relation. The output rows resulting through application of the function 120 may be generated for further processing by some other function 120 and/or the query 118 (734).

Although the examples here have been provided in a relational database environment, the examples shown may also be applied to any suitable data store, such as file system. In other systems, such as a file system, data tables under analysis may include multiple inputs allowing multi-input SQL-MR functions, such as the function 120. Thus, the examples provided herein are not limited to relation database application and may be applied in any data store that allows data tables to be used. While various examples of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
an array of storage devices configured to store data;
an array of processing nodes in communication with the array of storage devices, the array of processing nodes configured to:
receive a request to perform at least one task associated with the data, wherein the request includes a function call to a function configured to operate on a first data table and a second data table included in the data;
partition rows of the first data table into a plurality of row partitions among respective subsets of the processing nodes based on a partition key common to both the first data table and the second data table, wherein at least one row partition of the first data table comprises a plurality of rows;
for each partition key, generate a relation, wherein each relation is a data structure configured to include a plurality of columns in a single row, wherein each column of the relation is configured to maintain multiple column values from at least one row of a different data table;
for each relation, insert a plurality of row values from at least one row of the first data table from one of the row partitions into a single column of a row of the relation according to the partition key;
distribute row values from at least one row of the second data table into another single column of at least one relation according to the partition key, wherein at least one row value from at least one column of the second data table is distributed into a column of a row of a relation and, wherein the column of the row of the relation is in a row of the relation having at least one row value from the first data table in a different column of the relation; and
execute the function on each relation to generate at least one output data object.

2. The system of claim 1, wherein the plurality of processing nodes is further configured to:
group generated relations; and
for each row in the grouped relations, iteratively process the rows of the first data table and the second data table according to the function to generate zero or more output rows.

3. The system of claim 1, wherein the plurality of processing nodes is further configured to order rows of the first data table per row partition.

4. The system of claim 1, wherein the plurality of processing nodes is further executable to partition the second data table into row partitions based on the partition key.

5. The system of claim 1, wherein the plurality of processing nodes is further executable to replicate the second data table at each row partition.

6. The system of claim 1, wherein the partition key is specified in the request.

7. A computer-implemented method executable by a plurality of processing nodes, the method comprising:
receiving a request to perform at least one task associated with data in a storage device, wherein the request includes a function call to a function configured to operate on a plurality of data tables included in the data;
retrieving the plurality of data tables from at least one storage device;
partitioning rows of a first one of the plurality of data tables into a plurality of row partitions among respective subsets of the processing nodes based on a partition key common to each data table, wherein at least one row partition of the first one of the plurality of data tables comprises a plurality of rows;

for each partition key, generating a relation, wherein each relation is a data structure configured to include a plurality of columns in a single row, wherein each column of the relation is configured to maintain multiple column values from at least one row of a different data table;

for each relation, inserting a plurality of row values from at least one row from a row partition of the first one of the plurality of data tables into a single column of the relation according to the partition key;

distribute row values from at least one row of the second data table into another single column of at least one relation according to the partition key, wherein at least one row value from at least one column of the second data table is distributed into a column of a row of a relation and, wherein the column of the row of the relation is in a row of the relation having at least one row value from the first data table in a different column of the relation;

distributing row values of other data tables into a respective column of at least one relation according to the partition key; and executing the function on each partition to generate at least one output data object.

8. The method of claim 7 further comprising:
grouping generated relations; and
for each row in the grouped relations, iteratively processing the rows of the plurality of data tables according to the function to generate zero or more output rows.

9. The method of claim 7 further comprising ordering rows of the first data table per row partition.

10. The method of claim 7, wherein distributing the other data tables comprises partitioning at least one of the other data tables among the row partitions based on the partition key.

11. The method of claim 7, wherein distributing the other data tables comprises replicating at least one of the other tables at each row partition.

12. The method of claim 7, wherein the partition key is specified in the request.

13. A non-transitory computer-readable medium encoded with a plurality of instructions executable by a processor, the plurality of instructions comprising:
instructions to receive a request to perform at least one task associated with data stored in at least one storage device, wherein the request includes a function call to a function configured to operate on a first data table and a second data table included in the data;
instructions to retrieve the first data table and the second data table from the at least one storage device;
instructions to partition rows of the first data table into a plurality of row partitions among respective subsets of the processing nodes based on a partition key common to both the first data table and the second data table, wherein at least one row partition of the first data table comprises a plurality of rows;
instructions to generate a relation for each partition key, wherein each relation is a data structure configured to include a plurality of columns in a single row, wherein each column of the relation is configured to maintain multiple column values from at least one row of a different data table;
instructions to insert, for each relation, a plurality of row values from at least one row of the first data table from one of the row partitions into a single column of a row of the relation according to the partition key;
instructions to distribute row values from at least one row of the second data table into another single column of at least one relation according to the partition key, wherein at least one row value from at least one column of the second data table is distributed into a column of a row of a relation and, wherein the column of the row of the relation is in a row of the relation having at least one row value from the first data table in a different column of the relation; and
instructions to execute the function on each relation to generate at least one output data object.

14. The computer-readable medium of claim 13, wherein the plurality of instructions further comprises:
instructions to group generated relations; and
instructions to iteratively process, for each row in the grouped relations, the rows of the first data table and the second data table according to the function to generate zero or more output rows.

15. The non-transitory computer-readable medium of claim 13, wherein the instructions to distribute the second data table the further comprise instructions to partition the second data table into row partitions based on the partition key.

16. The non-transitory computer-readable medium of claim 13, wherein the instructions to distribute the second data table comprise instructions to replicate the second data table at each row partition.

17. The non-transitory computer-readable medium of claim 13, wherein the partition key is specified in the request.

* * * * *